July 11, 1961 J. W. THOMAS 2,991,886
THERMAL DIFFUSION APPARATUS
Filed Jan. 27, 1958 2 Sheets-Sheet 1
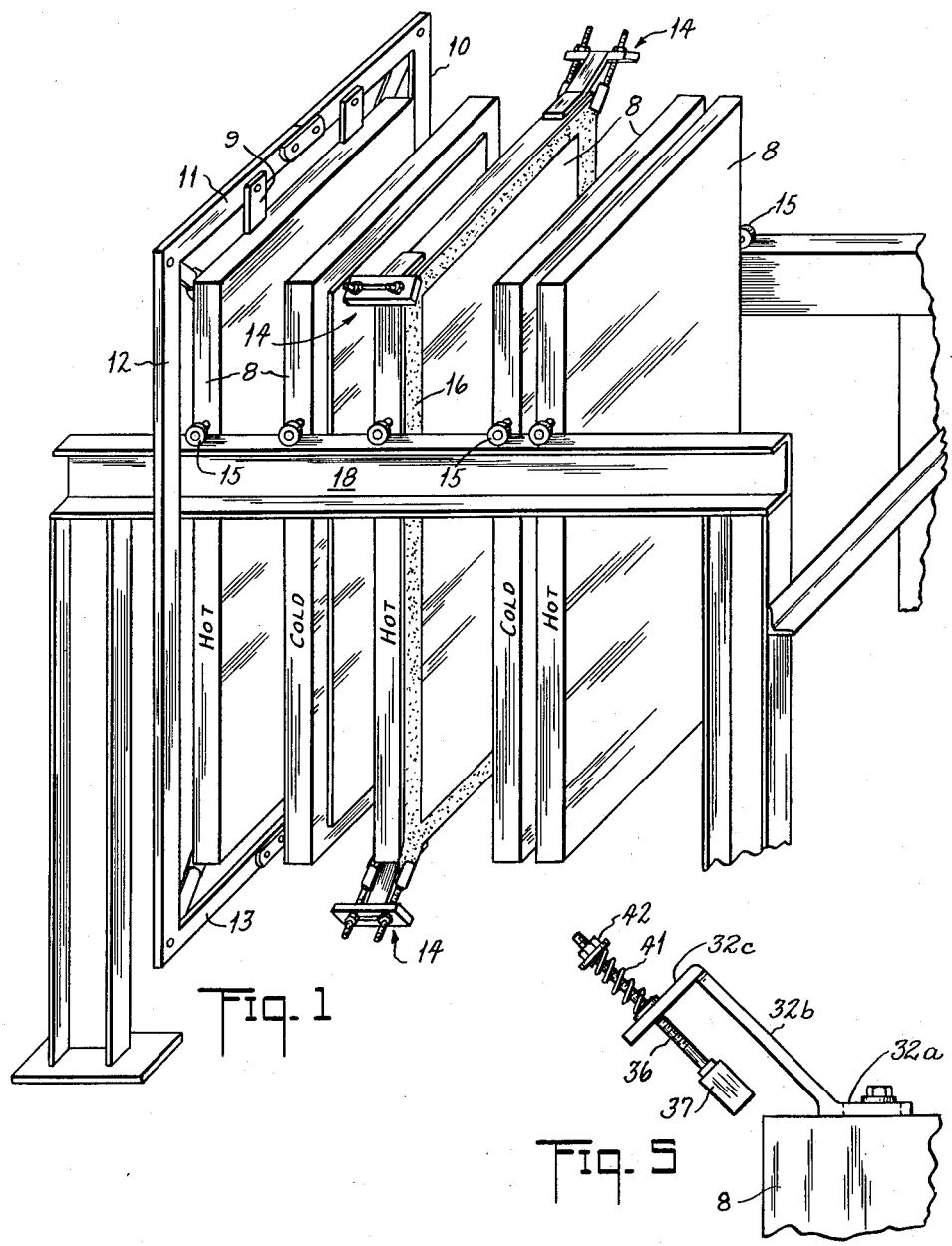
INVENTOR.
JOHN W. THOMAS
BY
Leland R. Chapman
ATTORNEY

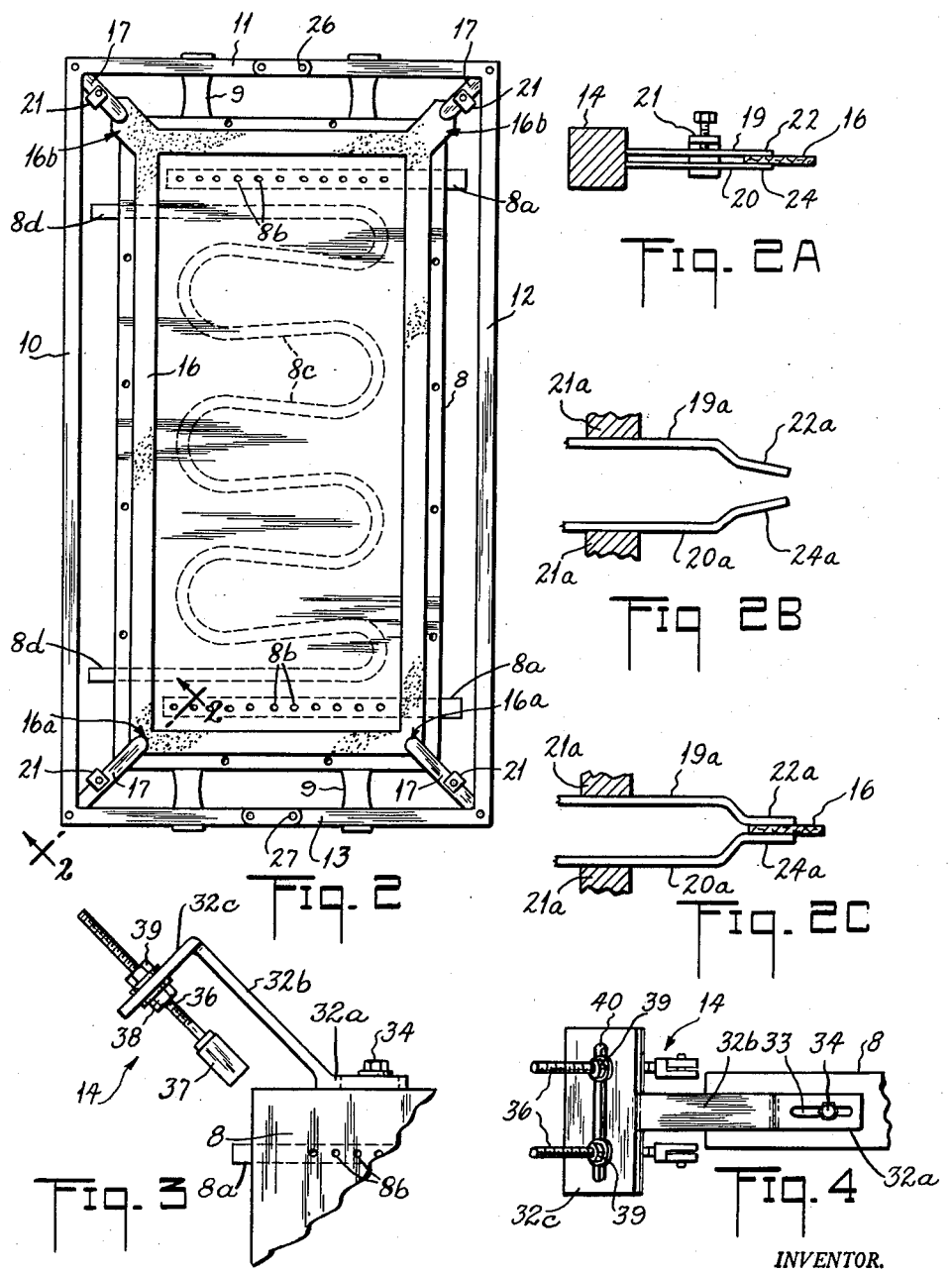

United States Patent Office 2,991,886
Patented July 11, 1961

2,991,886
THERMAL DIFFUSION APPARATUS
John W. Thomas, Mayfield Heights, Ohio, assignor, by mesne assignments, to Universal Oil Products Company, Des Plaines, Ill., a corporation of Delaware
Filed Jan. 27, 1958, Ser. No. 711,435
6 Claims. (Cl. 210—176)

The present invention relates to a thermal diffusion apparatus, and to structurally modified thermal diffusion plates enabling the expeditious assemblage of such apparatus.

Thermal diffusion apparatus of the type contemplated in essence consists of two or more plates spaced apart a fraction of an inch by a perimetrical gasket, i.e., a gasket which has a shape or configuration conformed generally to the shape and configuration of the plates and is disposed just inwardly of the perimeter to form a narrow separation chamber between the plates. An example of this type of apparatus is described in detail in the United States patent to Jones and Hughes, No. 2,541,069. The gasket seals the chamber against leakage and may have the further function of spacing the plates from one another the required distance to form the chamber. The plates are normally rather heavy since they are provided with heating or cooling means and are desirably formed of a material, usually a metal, having good thermal conductivity. The gaskets employed are usually thin and necessarily made of a somewhat flexible material. Thus, for example, each of the plates of a multi-plate thermal diffusion apparatus may have a length of approximately 6 feet, a width of approximately 3 feet, and a thickness of several inches, and the spacing between the opposed walls of the plates in operative condition may be only a small fraction of an inch, i.e. less than about 0.5 inch and preferably less than about 0.15 inch. The gasket may have a thickness of one-half inch or less, depending upon the final spacing of the chamber walls and, if the plates are rectangular in shape, have a corresponding rectangular outline wherein the width of the gasket may be only of the order of one or two inches.

Considerable difficulty has been encountered heretofore in assembling apparatus of this type and particularly in maintaining the gasket in the proper position relative to the plates when the plates are brought together. It is not desirable to use an adhesive to stick the gasket to one of the plates because such adhesive may have a deleterious effect on the resiliency and other characteristics of the gasket or be unstable under the conditions of separation by thermal diffusion. Furthermore, such materials have the disadvantage of complicating the disassemblage and cleaning of the apparatus between runs. The difficulty of assembling thermal diffusion apparatus is particularly apparent when the plates are relatively large and heavy and are to be assembled in the vertical position. It will be appreciated that particularly in these circumstances it is extremely important that the gasket between the plates be held rigidly in the proper position while it is sandwiched between the plates and that this be done in such a manner as not to interfere with the sealing function of the gasket or its spacing function.

In accordance with the present invention, a means is provided for efficiently assembling thermal diffusion apparatus comprising at least two plates and an intermediate flexible gasket sandwiched perimetrically between them to form a thermal diffusion separation chamber sealed against leakage. In essence, the means comprises a framework, or equivalent means, in, on, or from which the plates are movably supported and structural adaptation of the thermal diffusion plates which comprises a mountable support means connected to the plate and projecting outwardly therefrom, a suspending means connected to the outer extremity of the support means, and gripper arms mounted from the suspending means which are movable toward and away from the plate so as to support a flexible gasket and maintain it rigid in a position intermediate the plates.

In one preferred embodiment of the invention the plates are hung vertically from and are slidable horizontally along suitable bars, or the like, and suitable gripper means are adapted to the thermal diffusion plates providing gripper arms to support the gasket between the plates, maintaining it in a rigid configuration conforming to the shape of the plates until the plates are moved together into operative relation. The thermal diffusion plate may be readily modified with means to provide said gripper arms. One modification involves positioning a frame of a configuration similar to the plate on the outside of the plate by means of suitable supports secured to the plate. The frame therefore forms an outline around the plate in which its members are proportionately larger than the corresponding portions of the plate. Gripper arms are provided at each corner of the frame extending inwardly toward the plate. Another modification involves securing individual support means about the periphery of the plate which comprises a base member attached to the plate, an arm joined to the base and projecting outwardly from the plate, and a cross member joined to the outer extremity of the arm. Gripper arms are mounted on the cross member of the support means extending inwardly toward the plate. Each gripper arm is preferably provided with a jaw member at its inner extremity and clamp means for actuating the member to grip a corner portion of the gasket. Thus, for example, one of the two plates modified in either manner described above may be used to support a gasket while the two plates are moved toward one another to sandwich the gasket between them.

One of the primary advantages of the invention, therefore, is to provide a method for assembling a bulky thermal diffusion apparatus and obtaining a delicate adjustment thereof in a most expeditious manner, averting the necessity of using adhesive materials or other time-consuming methods to position gaskets between the plates prior to the assembly thereof.

These and other advantages of the invention will become more apparent from the following detailed description made with reference to the accompanying figures of the drawing, in which:

FIGURE 1 is a perspective view illustrating various exemplary embodiments of the invention as used in the assembly of thermal diffusion apparatus plates;

FIGURE 2 is a schematic view of one of the exemplary embodiments of the invention;

FIGURE 2a is a sectional view taken on section line 2—2, looking in the direction of the arrows of FIGURE 2, showing a gripping member;

FIGURE 2b is a detailed sectional view of another embodiment of the gripping member in its non-operative position;

FIGURE 2c is a view of the gripping member illustrated in FIGURE 2b in its operative position;

FIGURE 3 is a view in side elevation of an alternate embodiment of the invention;

FIGURE 4 is a top view of the embodiment of FIGURE 3; and

FIGURE 5 is a view in side elevation of a modification of the embodiment illustrated in FIGURES 3 and 4.

Referring to FIGURE 1, a plurality of alternate hot and cold thermal diffusion plates 8 having suitable configurations are arranged in various stages of assembly as a conventional thermal diffusion unit. Reference to FIGURE 2 and FIGURE 3 illustrates the manner in which each plate has an inlet and an outlet 8a, which extends into the plate and communicates with the thermal diffusion chamber through the openings 8b for the purpose of feeding and withdrawing liquid to be separated. The plates are heated or cooled by a conduit 8c having an inlet and outlet 8d through which a heating or cooling medium may be circulated. The feeding arrangement and the heating and cooling means are shown in greater detail in Patent Nos. 2,720,975 and 2,720,977. In accordance with the invention, each of the thermal diffusion plates 8 may have a gripper means mounted thereon, or every other plate may have a gripper means mounted thereon for supporting two gaskets, one on each side of the plate and adapted to be sandwiched between the plate from which they are supported and the plates adjacent each side.

More particularly, a first type of gripper means may comprise a separable frame having side members 10, 11, 12, and 13, which is secured to thermal diffusion plate 8 by means of support brackets 9. The frame supports the gasket by means of the gripper arms 17, as shown in detail by FIGURE 2. A second type of gripper means may comprise a plurality of separate support devices 14 mounted on the plate 8 in spaced-apart relation and adapted to have one or more gaskets 16 stretched between the supporting devices 14 on one or both sides of the plate 8. The details of the supporting device 14 are shown in FIGURES 3, 4, and 5.

The individual plates 8 may be movably mounted by means of roller means 15 attached thereto and in rolling engagement with a horizontal portion of an assembly frame or rack 18. When the plates 8 are mounted on the assembly frame 18, the adjacent plates 8 may be rollably separated and the gaskets 16 arranged on the plates embodying supporting frame 10, 11, 12, and 13, or the supporting device 14. Then the plates 8 may be brought together in any suitable manner. For example, conventional long studs (not shown) may pass through the several plates 8 and have nuts threaded thereon, which when tightened serve to force the plates 8 together. In large units, it is contemplated that heavy springs or a hydraulic ram would be utilized in a conventional manner to draw the plates 8 together.

The exemplary embodiment of FIGURE 2 comprises the rectangular frame, including the side members 10, 11, 12, and 13 that are of greater dimensions than the corresponding portions of the rectangular gasket 16, and the four gripper arms 17, one extending inwardly from each corner of the frame to grip a corner portion of the gasket 16. The frame 10, 11, 12, and 13 may be removably supported in any suitable manner from the thermal diffusion plate 8 by support brackets 9, which may be unitary with plate 8 or removably attached thereto.

The corner portions of the gasket 16 gripped by the gripper arms 17 may be portions of the main body of the gasket as shown at 16a, or extentions or ears as shown at 16b. As shown schematically in FIGURE 2 and in more detail in FIGURE 2a, the gripper arms may suitably comprise two resilient members 19 and 20 urged together by a clamp, or like mechanism, 21 so that the inner ends 22 and 24 of the members 19 and 20, respectively, will resiliently and effectively grip a corner portion of the gasket 16. The use of gaskets having extensions or ears such as those shown at 16b is preferred because the thickness and strength of the inner ends 22 and 24 of the members 19 and 20 can then be made greater and the gasket can be clamped more tightly without danger of impairing the effectiveness of the main body of the gasket as a seal and spacer.

In FIGURES 2b and 2c, the gripper arm may comprise members 19a and 20a, bent as shown to form jaw members 22a and 24a and actuated by a clamping mechanism 21a. In this embodiment the members 19a and 20a are formed so that the jaw members 22a and 24a are in a convergent position when the clamping mechanism 21a is open and become parallel to one another when the clamping mechanism is actuated in order to securely and resiliently clamp the gasket portion 16, as shown in FIGURE 4.

For convenience in moving the gasket support device into position, the frame members 11 and 13 are hinged at 26 and 27, respectively. Since the hinging at 26 and 27 would be subject to compressive forces, the hinging may be accomplished in any conventional manner, as long as the hinge is sufficiently rigid to withstand buckling. Further, the hinge may be of any suitable separable form whereby either one or both of the frame members 11 and 13 may be disjointed to facilitate removal.

It is preferred that the lengths of the frame members 10 and 12 and of the frame members 11 and 13 be proportional to the length and width, respectively, of the gasket 16. It has been found that when a gasket is made of an elastic material, it must be held in uniform tension along each side thereof in order to preserve the gasket in its proper shape. Accordingly, the gripper arms 17 must be arranged in such a manner as to provide the required uniform tension. It will be apparent that the angle at which the gripper arm 17 contacts the gasket 16 will determine the distribution of the load to the contiguous section of the gasket. For example, assuming the cross-sectional width of the sides of the gasket 16 to be uniform, and also equidistant from and parallel to the adjacent side members 10, 11, 12, and 13 of the rectangular frame, if the gripper arm 17 is positioned at an angle of 45° with one of the side members, e.g., the side member 10, the load on the two contiguous sections of the gasket 16 will be uniform. If the width of the gasket at the top is not the same as at the side, the angle may be varied to give equal tension.

In assembling a multi-plate thermal diffusion unit, the gaskets 16 are supported between adjacent plates of the thermal diffusion apparatus in the manner described until the plates have been bolted together with sufficient pressure to maintain the gaskets in their proper position without external support. The clamps on the gripper arms are then opened to release the jaw members at the inner extremities of the gripper arms from the gasket, the jaw members are withdrawn, and the pressure between the plates is then further increased, if desired, until the thermal diffusion separation chambers formed between them by the gaskets are of the required thickness and are leak-proof. The gasket-supporting structure may be removed from the thermal diffusion plates 8 after the unit is assembled.

In FIGURES 3 and 4, the gasket support 14 is mounted on the edge of the thermal diffusion plate 8. A support means comprising base member 32a, arm 32b, and cross member 32c may be adjustably mounted on the plate 8 by means of a slot 33 in the base 32a which may be adapted to receive a bolt 34 for engaging the plate 8. It will be obvious that the support means may be moved pivotally about the bolt 34, as well as along the edge of the plate 8. A pair of gripper arms 36, which each include a clamp 37 of any suitable design at one end thereof, may be adjustably mounted on the cross member 32c of the support means. For example, the gripper arms 36 may be threaded rods adapted to pass through a slot 40 in the cross member 32c of the support means, preferably perpendicular to the wall of the plate 8, and be fixed in position by two lock nuts 38 and 39. The gripper arms 36 should be so positioned that they support the gaskets 16 in plates immediately adjacent the walls of the plate 8.

The modification of FIGURE 5 includes a spring means 41 in cooperative relation with the gripper arm 36. More particularly, when the clamp 37 engages a gasket 16, the force on the gasket 16 is controlled by the compression of the spring means 41 between the cross member 32c and an adjusting nut 42 on the gripper arm 36. Since spring deflection is a direct measure of force, the spring length of each of the several spring means 41 supporting the gasket may be readily adjusted to provide an equal load on the different portions of the gasket 16.

It is to be understood that various alternative embodiments of the invention will readily occur to those skilled in the art upon reading this description. For example, the gripper arms 17 may be pivotally mounted in the corners of the rectangular frame so as to permit adjustment of tension by variation of the angle of contact with the gasket, or they may be mounted at a fixed angle, but adjustable in longitudinal extension, from the corners. Variations in tension may be achieved by varying the cross-sectional width of the sections of the gaskets to be supported. If desired, the supporting device 14 may include only one gripper arm 36 for supporting a single gasket in a plane immediately adjacent one of the walls of the plate 8. All such alternative embodiments are intended to be included within the scope of the invention as defined in the accompanying claims.

I claim:

1. A thermal diffusion apparatus comprising at least two thermal diffusion plates having opposed surfaces adapted to be uniformly spaced apart, means for establishing a temperature gradient between said plates, a peripheral gasket adapted to be positioned perimetrically between said plates and forming therewith and between the opposing surfaces a thermal diffusion chamber sealed against leakage by said gasket, means for introducing and withdrawing liquid into and from said chamber, means for mounting said plates vertically and for lateral movement relative to each other, and gasket supporting means mounted on at least one of said plates to position and hold the gasket perimetrically between said plates while said plates are moved laterally relative to each other and into contact with said gasket.

2. The apparatus of claim 1 in which the gasket supporting means comprises a plurality of gripper means disposed about the periphery of at least one of said thermal diffusion plates, said gripper means comprising a base member attached to said plate, an arm connected to said base member and projecting outwardly therefrom, a cross support member secured to the outward end of said arm, gripper arms mounted on said cross support, means for moving said gripper arms toward and away from said plate, and clamps provided at the end of said gripper arms adapted to clamp and hold a gasket in a position adjacent to at least one face of said plate member.

3. A thermal diffusion plate adapted to be used in a liquid thermal diffusion apparatus comprising a plate member, support means mounted on said plate member and projecting outwardly therefrom, suspending means connected to the outer extremity of said support means, gripper arms mounted on said suspending means, and clamps provided at the end of said gripper arms adapted to clamp and hold a gasket in a rigid position adjacent at least one face of said plate member.

4. A thermal diffusion plate adapted to be used in a liquid thermal diffusion apparatus comprising a plate member, a plurality of gripper means disposed about the periphery of said plate member, said means comprising a base member attached to said plate member, an arm connected to said base member and projecting outwardly therefrom, a cross support member secured to the outward end of said arm, gripper arms mounted on said cross support, means for moving said gripper arms toward and away from said plate member, and clamps provided at the end of said gripper arms adapted to clamp and rigidly hold a gasket in a perimetrical position adjacent each face of said member.

5. A thermal diffusion plate adapted to be used in a liquid thermal diffusion apparatus comprising a plate member, support brackets mounted on said plate member disposed about the periphery of said plate member and projecting outwardly therefrom, a frame of a configuration similar to the plate member attached to the outer extremity of said supports so that said frame forms an outline around the outer periphery of said plate member substantially equidistant from the corresponding portions of said plate member, gripper arms adjustably mounted at each corner of said frame to move said gripper arms toward and away from said plate member, and clamps provided at the end of said gripper arms adapted to clamp and rigidly hold a gasket in a perimetrical position adjacent to at least one face of said plate member.

6. A rectangular plate adapted to be used in a liquid thermal diffusion apparatus comprising a rectangular plate member, support brackets mounted on said plate member disposed about the periphery of said plate member and projecting outwardly therefrom, a separable rectangular frame attached to the outer extremity of said supports where the dimensions of the members of said frame are proportionately larger than the dimensions of the corresponding portions of said plate member, gripper arms pivotally mounted at each corner of said frame and adjustably positioned to move toward and away from said plate member, and clamps provided at the end of said gripper arms adapted to clamp and rigidly hold a gasket in a perimetrical position adjacent to at least one face of said plate member.

References Cited in the file of this patent

UNITED STATES PATENTS

| | | |
|---|---|---|
| 249,176 | Hart | Nov. 8, 1881 |
| 1,877,787 | Argabrite | Sept. 20, 1932 |
| 2,720,976 | Jones | Oct. 18, 1955 |
| 2,788,321 | Thomas | Apr. 9, 1957 |
| 2,788,322 | Dillon | Apr. 9, 1957 |